Figure 2:
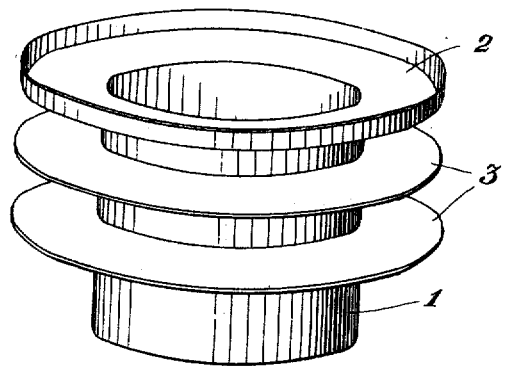

S. M. SIVARD.
BOILING POT FOR LIQUIDS.
APPLICATION FILED OCT. 5, 1905.

908,044.

Patented Dec. 29, 1908.

UNITED STATES PATENT OFFICE.

SVEN MAGNUS SIVARD, OF STOCKHOLM, SWEDEN.

BOILING-POT FOR LIQUIDS.

No. 908,044.     Specification of Letters Patent.     Patented Dec. 29, 1908.

Application filed October 5, 1905. Serial No. 281,398.

*To all whom it may concern:*

Be it known that I, SVEN MAGNUS SIVARD, a subject of the King of Sweden, and resident of Garfvaregatan 1, Stockholm, Sweden, have invented a new and useful Improvement in Boiling-Pots for Liquids, of which the following is a specification, reference being had to the drawing accompanying and forming a part hereof.

This invention relates to improvements in boiling-pots for milk and other liquids with the object of preventing the liquid boiling over.

The invention consists, chiefly, in the combination with a boiling-pot having an enlarged part at its top, of one or more ring-shaped flanges, plates, or the like, below the said enlarged part adapted to prevent the latter from being directly heated by the source of heat used.

In the accompanying drawing I have illustrated two embodiments of my invention.

Figure 1:
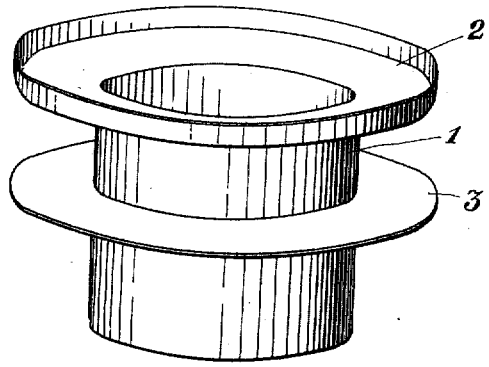

Figure 1 shows a perspective view of a boiling-pot provided with one such flange, and Fig. 2 shows a like view of a boiling-pot provided with two flanges.

Referring to the drawing, the boiling-pot 1 is at the top provided in well known manner with an enlarged part 2 the bottom of which, suitably, is flat or approximately flat. Below the said part 2 and at a distance therefrom is provided a ring-shaped plate or flange, 3 (or two or more such flanges as shown in Fig. 2) secured in any suitable manner to the pot or made integral therewith. The said flange or flanges 3 may suitably be of the same radial extension as the part 2 and prevent the latter from being directly heated by the source of heat on which the boiling-pot is placed. On account thereof the enlarged part 2 will keep itself at a comparatively low temperature during the boiling, so that it can cool the liquid eventually swelling up onto the said part 2, the said cooled liquid when flowing back into the pot acting to stop the swelling.

The invention may obviously be modified in details without departing from the principle thereof.

I am aware that an extension at the top of a boiling pot is known in itself, and that flanges for boiling pots are common, and I, therefore, do not claim such elements, except in the combination set forth in the claim.

Having now described my invention, what I claim as new and desire to secure by Letters Patent is:

The combination with a boiling pot, of an extension at the top of the pot adapted to receive the liquid boiling over and allow it to run back into the boiling pot, and a flange situated below the said extension and adapted to protect the same from radiating heat, substantially as and for the purpose set forth.

In testimony whereof I have signed my name to this specification in presence of two subscribing witnesses.

SVEN MAGNUS SIVARD.

Witnesses:
    GERDA LINDKVIST,
    EBBA BREUER.